United States Patent [19]
Gandre

[11] Patent Number: 5,714,941
[45] Date of Patent: Feb. 3, 1998

[54] INTEGRAL INFORMATION AND ENERGY STORAGE SYSTEM

[75] Inventor: Jerry D. Gandre, Austin, Tex.

[73] Assignee: Dell U.S.A., L.P., Austin, Tex.

[21] Appl. No.: 636,012

[22] Filed: Apr. 22, 1996

[51] Int. Cl.[6] .................................................. G08B 21/00
[52] U.S. Cl. ..................... 340/671; 340/679; 360/73.01; 369/258; 324/163; 388/812
[58] Field of Search .................................... 340/671, 670, 340/672, 679, 693; 360/70, 75, 74.1, 105, 73.01, 99.04, 99.08, 98.07; 388/812; 324/163; 369/258, 266, 264

[56] References Cited

U.S. PATENT DOCUMENTS

| | | | |
|---|---|---|---|
| 3,611,343 | 10/1971 | Schoenbach | 340/671 |
| 4,007,492 | 2/1977 | Rose | 360/75 |
| 4,417,288 | 11/1983 | Hattori et al. | 360/74.1 |
| 4,435,702 | 3/1984 | Imai | 340/671 |
| 4,706,142 | 11/1987 | Hattori et al. | 360/105 |
| 4,831,469 | 5/1989 | Hanson et al. | 360/75 |
| 4,918,743 | 4/1990 | Tsuyuguchi | 388/812 |
| 4,990,837 | 2/1991 | Ishitobi | 318/375 |
| 5,124,605 | 6/1992 | Bitterly et al. | 310/74 |
| 5,268,608 | 12/1993 | Bitterly et al. | 310/90 |
| 5,282,835 | 2/1994 | Wright et al. | 606/242 |

*Primary Examiner*—Jeffery Hofsass
*Assistant Examiner*—Benjamin C. Lee
*Attorney, Agent, or Firm*—Haynes and Boone, L.L.P.

[57] ABSTRACT

An integral information and energy storage system is disclosed comprising a disk drive having a housing, a shaft rotatably mounted therein, and a disk platter coupled to the shaft. A flywheel is also coupled to the shaft and includes, embedded in the flywheel, magnets having magnetic fields emanating therefrom. Electrical coils are positioned in the housing for receiving electrical energy from a power supply line and generating an electromagnetic field effective for selectively repulsing or attracting the magnets to thereby rotate the flywheel and convert electrical energy in the coils into kinetic energy in the flywheel. Alternatively, if power is not available on the power supply line, the coils generate electrical energy as the magnetic field is caused from rotation of the flywheel and the magnet embedded therein to move across the coil, thereby converting kinetic energy in the flywheel back into electrical energy in the coil and to the power supply line.

50 Claims, 3 Drawing Sheets

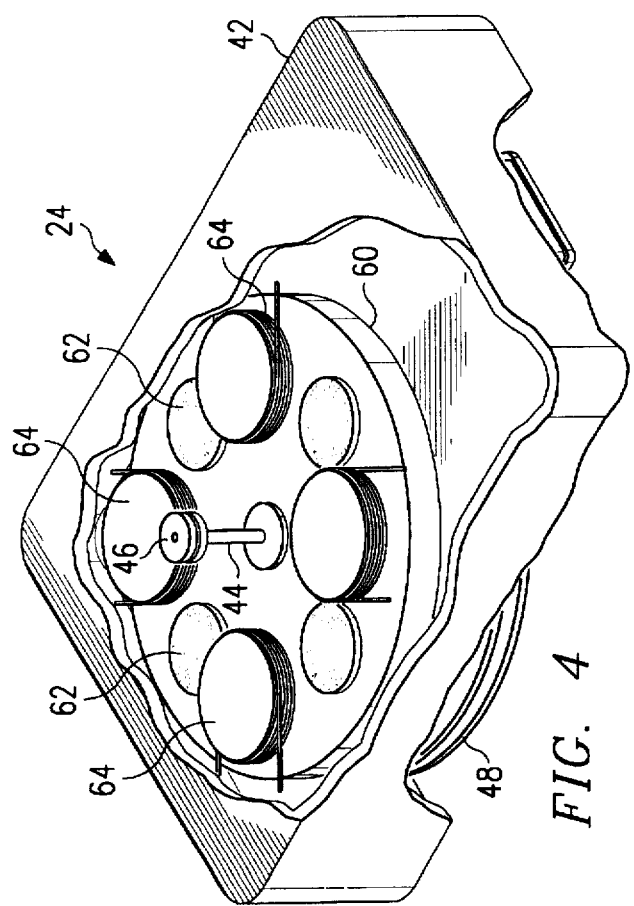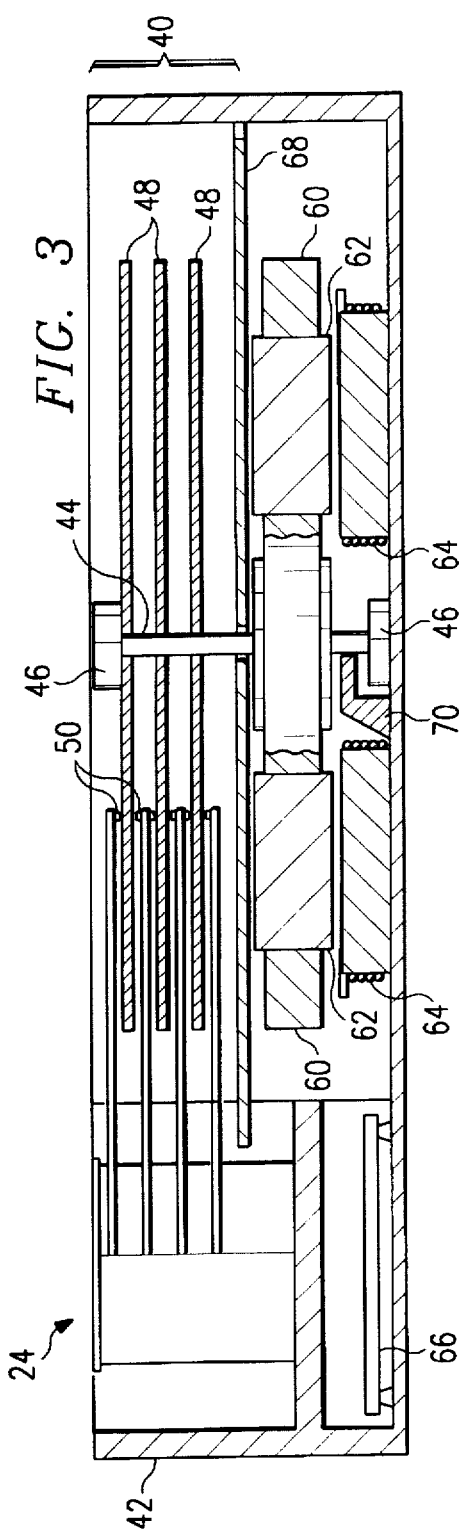

INTEGRAL INFORMATION AND ENERGY STORAGE SYSTEM

TECHNICAL FIELD

The invention relates to a system in which a disk drive data storage device is integrated with a flywheel and, more particularly, to such a system in which electrical energy may be stored as, and recovered from, kinetic energy in the flywheel.

BACKGROUND OF THE INVENTION

Computers are typically operated from electrical power supplied either as alternating current (AC) received from a wall power outlet, or as direct current (DC) received from a battery. These sources of power are subject to failure from power interruptions, disruptions, shortages, drainage. When a power failure occurs during the operation of a computer, it may not be possible to shut down the computer in an orderly manner. As a result, information, such as data and computer program files, that are stored in volatile memory, such as RAM, can be lost. Lost data may be irreplaceable or, if replaceable, may require much valuable time and energy to replace. Moreover, during such non-orderly shut downs, data as well as cross-linked program files may be irreparably damaged and program files may require reloading to regain operability.

A partial solution to the foregoing problems is to use an uninterruptable power supply (UPS). Such UPS's, however, are expensive and are too large and heavy to be practical for use in portable computers such as notebook computers and laptop computers.

Therefore, what is needed is a low-cost energy storage system which can store sufficient energy for operating a computer and for shutting down the computer in an orderly manner so that valuable information is not lost.

SUMMARY OF THE INVENTION

The present invention, accordingly, provides a system in which energy storage is integrated with information storage. The system comprises a disk drive having a housing, a shaft rotatably mounted therein, and a disk platter coupled to the shaft. A flywheel is also coupled to the shaft and includes, embedded in the flywheel, magnets having magnetic fields emanating therefrom. Electrical coils are positioned in the housing for receiving electrical energy from a power supply line and generating an electromagnetic field effective for selectively repulsing or attracting the magnets to thereby rotate the flywheel and convert electrical energy in the coils into kinetic energy in the flywheel. Alternatively, if power is not available on the power supply line, the coils generate electrical energy as the magnetic field is caused from rotation of the flywheel and the magnet embedded therein to move across the coil, thereby converting kinetic energy in the flywheel back into electrical energy in the coil and to the power supply line.

A technical advantage achieved with the present invention is that, when electrical power failures occur due to such events as power interruptions, disruptions, and shortages, the kinetic energy stored in the flywheel is available as a source of reserve energy that can be converted into electrical energy for enabling the computer system to be shut down in an orderly manner so that valuable information is not lost or corrupted.

A further technical advantage achieved with the present invention is that the flywheel and disk platters spin continuously. Therefore, when the disk drive controller is activated to read or write data, the wait time to spin up the platters is zero, thereby providing for quicker disk reads and writes than is possible with conventional disk drive systems.

BRIEF DESCRIPTION OF THE DRAWINGS

FIG. 3 is a cross-sectional elevational view of the system of FIG. 2 taken along the line 3—3 of FIG. 2.

FIG. 4 is a perspective, partially broken-away view of the underside of the system of FIG. 2.

DESCRIPTION OF THE PREFERRED EMBODIMENTS

Figure 1:
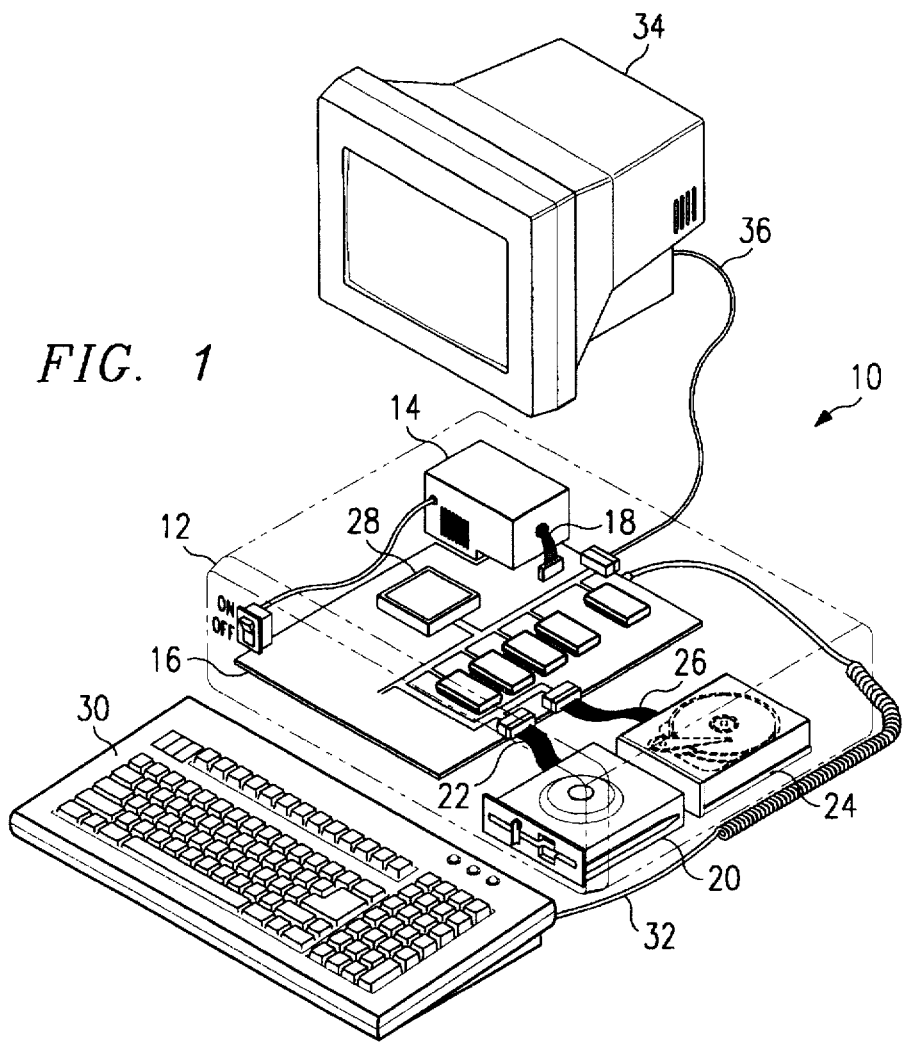
FIG. 1 is a perspective view of a computer system having an integral information and energy storage system embodying features of the present invention.

Referring to FIG. 1, the reference numeral 10 refers to a desktop computer system, though it may also refer to a laptop computer, a file server, a mainframe computer, or the like. The computer system 10 includes a case 12 (shown in phantom) which houses a power supply 14, a motherboard 16 electrically connected via a positive power supply line 18 to the power supply, a floppy disk drive 20 operatively connected to the motherboard via a ribbon cable 22, and an integral information and energy storage system 24 according to the present invention operatively connected to the motherboard via a ribbon cable 26. The motherboard 16 includes a central processing unit (CPU) 28 connected for receiving electrical power from the power supply 14 via the power supply line 18 and a positive power supply plane (not shown) embedded within the motherboard. The computer system 10 also includes a keyboard 30 operatively connected to the motherboard 16 and CPU 28 via a cable 32 for inputting data and instructions to the CPU 28, and a video monitor 34 operatively connected to the motherboard 16 and CPU 28 via a cable 36 for displaying output generated by the CPU. Except for the storage system 24, the foregoing components of the computer system 10 are well known in the art and will, therefore, not be described in further detail.

Figure 2:
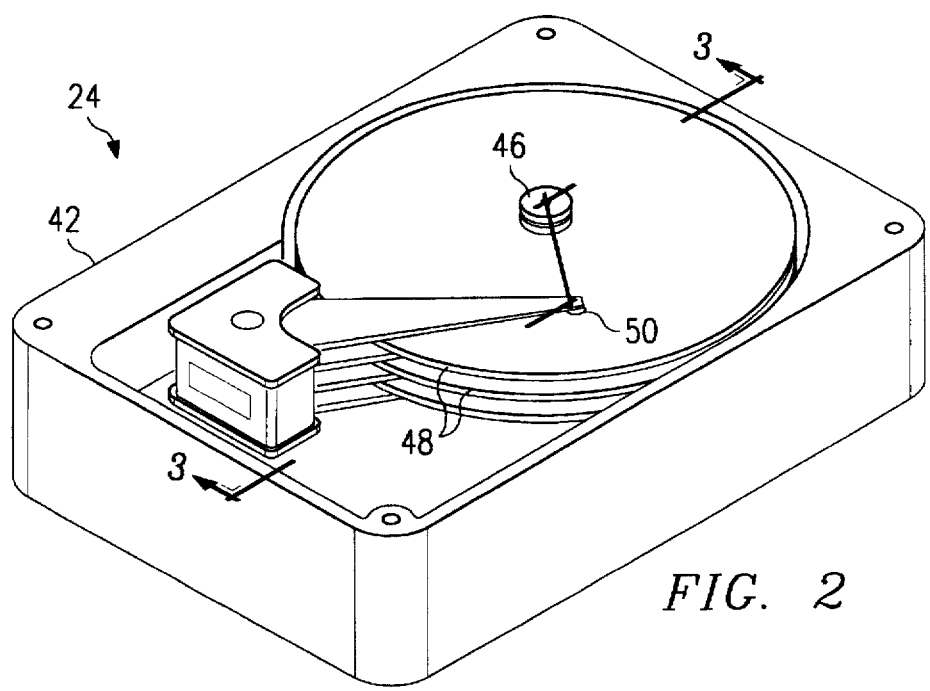
FIG. 2 is a perspective view of the integral information and energy storage system of FIG. 1.

As more clearly shown in FIGS. 2–4, the integral information and energy storage system 24 includes a hard disk drive data storage device 40 having a housing 42 (shown without a top cover for clarity of presentation) and a shaft 44 (FIG. 3) rotatably seated on ball or needle bearings 46 mounted in the housing. In a manner well known to those skilled in the art, a plurality of spaced disk platters 48 are mounted on the shaft 44 between a corresponding plurality of heads 50 configured for writing and reading information to and from the platters. The technique for writing and reading information to and from the disk platters 48 is well known to those skilled in the art and will therefore not be described in further detail.

As shown in FIGS. 3 and 4, and in accordance with the present invention, a flywheel 60 is coupled to the shaft 44 for synchronous rotation with the platters 48. The flywheel 60 includes four circumferentially-spaced magnets 62 embedded therein, each of which magnets has a magnetic field emanating therefrom. The magnets 62 are preferably formed from a rare-earth material and are arranged so that the magnetic polarity of adjacent magnets oppose each other. Four circumferentially-spaced electrical coils 64 are mounted in the housing 42 in an electromagnetic field relationship with the magnets 62. The coils 64 are electrically connected to circuitry 66 having a microprocessor (not shown) and field effect transistors (FETs, not shown) operably connected for controlling the direction of electrical power (or energy) between the coils 64 and the power supply 14 and power line 18 as described below. It will be appreciated that a motor, which is required to rotate the platters 48 in a conventional disk drive system, is not required in the present invention. A metallic electromagnetic shield 68 is interposed between the platters 48 and the flywheel 60 for protecting information stored on the platters from the magnetic influence of the magnets 62 and the coils 64. A sensor 70 is positioned within the housing 42 for determining the revolutions per minute (RPM) experienced by the disk platters 48. The sensor 70 is electrically connected for generating to the circuitry 66 and to a disk drive controller (not shown) a signal indicative of the shaft RPM sensed, for reason described below.

It will be appreciated that as the flywheel 60, and the magnets 62 embedded therein, rotate, the magnetic fields emanating from the magnets will move across the coils 64 and induce a flow of electrical energy, or power, in the form of alternating current through the coils 64, in a manner well known to those skilled in the art. Alternatively, it will be appreciated that by passing electrical energy in the form of alternating current through the coils 64, the magnets 62 may be selectively repulsed and attracted to effect rotation of the flywheel 60. Thus, electrical energy may be converted to and stored as mechanical, or kinetic, inertial energy in the flywheel 30 and, alternatively, mechanical inertial energy stored in the flywheel may be converted to electrical energy for operating the computer system 10. It is understood that a regulator (not shown) maybe utilized to convert the generated alternating current into direct current useable by the computer system 10.

Figure 5:
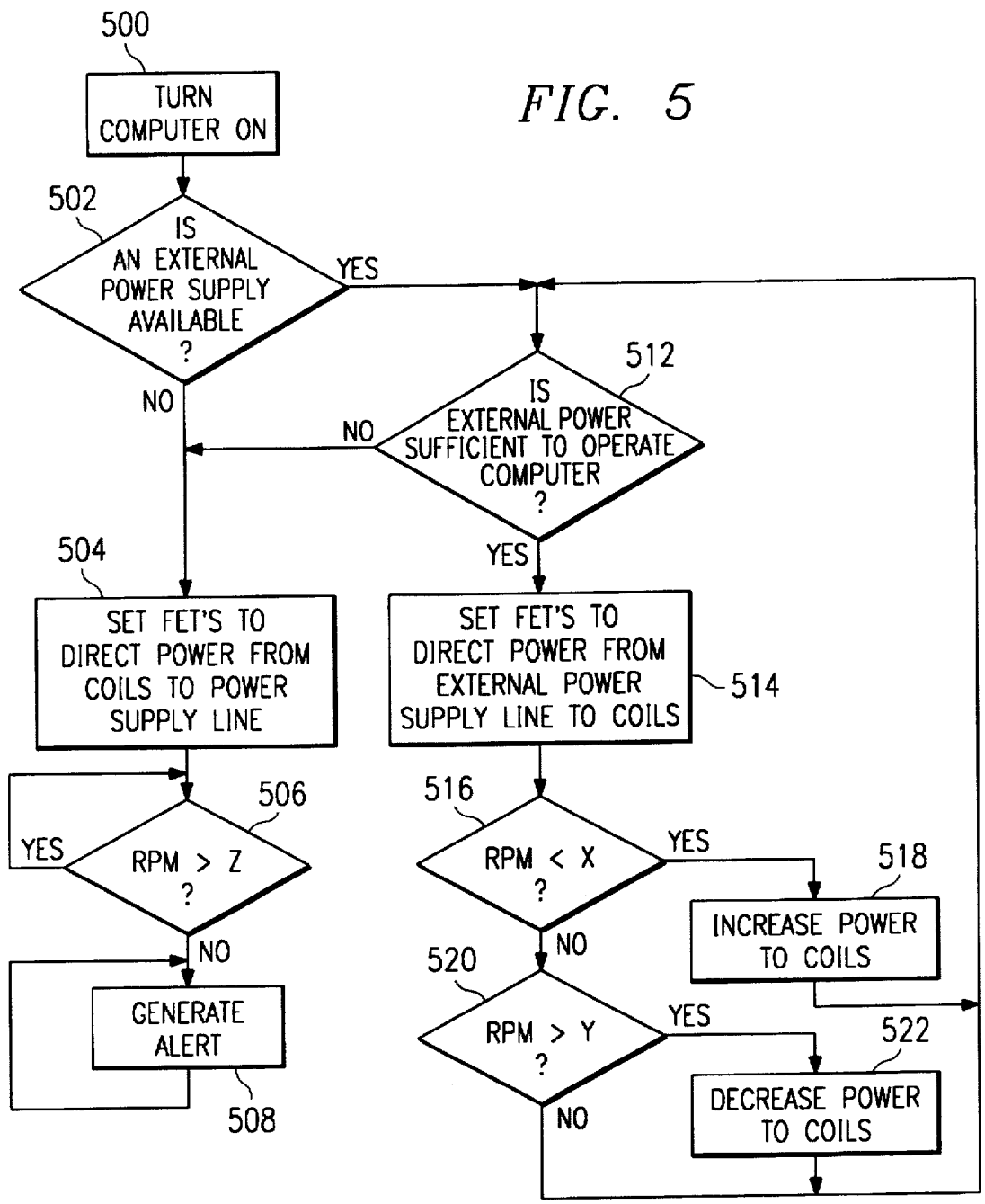
FIG. 5 is a flowchart illustrating control logic for controlling the flow of electrical power in the system of FIG. 2.

FIG. 5 is a flow chart illustrating control logic for operating the system 10 in accordance with the present invention. It is understood that the logic may be implemented by microcode instructions contained within the circuitry 66.

In step 500, a switch (not shown) controlling power to the computer system is closed to turn on the computer system 10. In step 502, the circuitry 66 determines whether an external power supply, such as the power supply 14, or a battery (i.e., any power supply or source except the coils 64), is available for supplying electrical power to the computer system 10. If a determination is made in step 502 that such an external power supply is not available, then execution proceeds to step 504, in which the appropriate FETs within the circuitry 66 are activated for directing the transfer of power from the coils 64 to the power supply line 18 as the magnetic fields emanating from the magnets are caused from rotation of the flywheel 60 to move across the coils. Execution then proceeds to step 506, in which a determination is made whether the RPM of the shaft 44 indicated by the sensor 70 is greater than a minimum threshold RPM of "Z" (i.e., that RPM>Z, where Z may be, for example, 1,000 RPM) necessary to generate sufficient power to sustain operation of the computer system 10 for more than a predetermined amount of time such as, for example, one minute. Preferably, the predetermined amount of time will be sufficient to allow for an orderly shutdown of the computer system 10 during a power failure. If a determination is made that RPM>Z, then execution returns to step 506; otherwise, execution proceeds to step 508, in which an alert is generated for indicating that power generated through the coils 64 from the rotation of the flywheel 60 will end within the aforementioned predetermined time, thereby providing the user with sufficient time to shut down the computer in an orderly manner and save any data or program files that are opened. The alert provided in step 508 may be any conventional alert such as, for example, a warning displayed on the video monitor 34, an illuminated light emitting diode (LED), an audible warning made through a speaker connected to the computer system 10, or the like. Execution then returns to step 508 and generation of the alert continues until the computer system 10 is shut down.

If in stop 502 it is determined that an external power supply is available, then execution proceeds to step 512, in which a determination is made whether the power available from the power supply line 18 is sufficient to operate the computer system 10. If in step 512 it is determined that the available power is insufficient, then execution proceeds to step 504. Otherwise execution proceeds to step 514, in which the circuitry 66 activates the appropriate FETs for directing the delivery of power from the power supply line 18 to the coils 64 for inducing rotation of the flywheel 60 and the disk platters 48. Execution then proceeds to step 516, in which a determination is made whether the RPM of the shaft 44 indicated by the sensor 70 is less than an RPM of "X" (i.e., that RPM<X?), wherein the shaft 44 with the platters 48 and the flywheel 60 coupled thereto, are configured to spin optimally within a defined RPM range of X<RPM<Y, where X and Y are predetermined minimum and maximum threshold values, respectively, such as, for example, 50,000 and 51,000 RPM, respectively. If in step 516 a determination is made that RPM<X, then execution proceeds to step 518, in which the power, or current, supplied to the coils 64 is increased via the circuitry 66 to thereby increase the RPM of the flywheel 60, and execution then returns to step 512. If in step 516 a determination is made that the RPM of the flywheel 60 is not less than X, then execution proceeds to step 520, in which a determination is made whether the RPM is greater than Y. If in step 520 a determination is made that RPM>Y, then execution proceeds to step 522, in which the power, or current, supplied to the coils 64 is decreased via the circuitry 66 to thereby decrease the RPM, and execution then returns to step 512.

It can be appreciated that as the speed of the flywheel 60 varies, so will the speed of the disk platters 48. Accordingly, the signal generated by the sensor 70 to the disk drive controller is utilized to control the speed at which data bits are written to and read from the disk platters 48, as well as the speed at which the heads 50 are moved during data read and write operations. A conventional buffer memory (not shown) may be utilized to store bits transferred between the disk platters 48 and the computer system 10 when the transfer rates of the two systems are not equal.

In operation, the computer system 10 may be operated from electrical power supplied from either an external power supply such as the power supply 14 or batteries, or, when the flywheel 60 is rotating, from the coils 64. If power is to be delivered from the coils 64, then the speed of the shaft 44 is monitored via the sensor 70, and an alert is generated if the RPM of the shaft falls below the aforementioned threshold RPM of Z necessary to sustain operation of the computer system for at least a predetermined amount of time such as, for example, one minute. If power is to be supplied from an external power supply, then the RPM of the flywheel 60 is brought up to be within the aforementioned predetermined RPM range defined as being between X and Y RPM, and is then maintained within that range. When the computer system 10 is powered down, the flywheel 60 continues to rotate until the forces of friction cause the flywheel to eventually stop rotating. It will be appreciated that while the flywheel 60 is rotating subsequent to the shut down of the computer system 10, kinetic energy (i.e., mechanical inertial energy) is stored in the rotating flywheel 60. The kinetic energy stored in the flywheel 60 may subsequently be converted to electrical energy for operation of the computer system 10 at locations where electrical energy is not readily available.

The present invention has several advantages. For example, when electrical power failures occur due to such events as power interruptions, disruptions, and shortages, kinetic energy stored in the flywheel 60 is available as a source of reserve energy that can be converted into electrical energy for enabling the computer system to be shut down in an orderly manner so that valuable information is not lost or corrupted. Furthermore, the flywheel 60 spins continuously during operation of the computer system 10, and because the disk platters 48 rotate with the flywheel via the shaft 44, the platters also spin continuously. Therefore, when the disk drive controller is activated to read or write data to or from the spinning platters 48, the wait time to bring the disks up to speed is zero, thereby providing for quick disk reads and writes.

It is understood that several variations may be made in the foregoing without departing from the scope of the invention. For example, more or less than four magnets 62 and coils 64 may be utilized. A portion of the coils 64 may also be dedicated to the continuous generation of electrical energy so that there will always be a reliable supply of power from the coils in the event that there is a power failure before the step 502 or the step 512 in the flowchart shown in FIG. 5 is executed. Furthermore, the remaining coils 64 that are not dedicated to generating electrical energy may be dedicated to effecting rotation of the flywheel 60, thereby obviating the need for any of the coils to be switchable between generating and using electrical energy. An appropriately sized and connected capacitor may also be utilized to ensure that there is always sufficient electrical energy to sustain operation of the computer system 10 until the steps 502 and/or 512 shown in the flowchart of FIG. 5 are executed.

As described more fully in U.S. Pat. No. 5,268,608 to Bitterly et al., incorporated herein by reference, the flywheel 60 may be supported by magnetic bearings and further stabilized during rotation by a self-restoring liquid bearing system. The flywheel may comprise a lightweight hub fabricated from high tensile strength materials and a circumferentially wound rim which, together with the magnetic bearings, would permit the flywheel to spin at speeds exceeding 100,000 RPM and even 200,000 RPM, thereby greatly enhancing the energy storage efficiency of the integral information and energy storage system 24.

The integral information and energy storage system 24 may also be utilized in other applications such as, for example, cameras that magnetically encode images and store them onto a disk platter. The storage system 24 or the flywheel 60 by itself may also be configured to facilitate removal from the computer system 10 or storage system 24, respectively. One or more removable flywheels may, for example, be carded with a laptop computer and then be exchanged with a flywheel having insufficient kinetic energy, due to a loss of RPM, to operate the laptop computer, thereby extending the usability of the laptop computer in the field.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. An energy storage device comprising:

a housing;

a shield mounted in the housing separating a disk platter section of the housing from a flywheel section of the housing;

a rotatable shaft extending through the shield and having a first shaft portion extending into the disk platter section and a second shaft portion extending into the flywheel section, at least one disk platter mounted for rotation with the first shaft portion and a flywheel mounted for rotation with the second shaft portion;

at least one magnet embedded in the flywheel, wherein the at least one magnet defines a magnetic field emanating therefrom; and at least one electrical coil positioned in the flywheel section and switchably connectable to an electrical power supply line for:

receiving electrical energy from the power supply line and generating an electromagnetic field effective for selectively repulsing or attracting the at least one magnet to thereby rotate the flywheel in a predetermined direction and convert electrical energy in the at least one coil into kinetic energy in the flywheel; and generating electrical energy to the power supply line as the magnetic field is caused from rotation of the flywheel and the at least one magnet embedded therein to move across the at least one coil and to thereby convert kinetic energy in the flywheel into electrical energy in the at least one coil to thereby provide power for continuing the flywheel rotation in said predetermined direction.

2. The energy storage device of claim 1, further comprising:

a sensor for determining the rate of rotation of the shaft, and for generating a signal indicative of the determined rate; and wherein the disk drive further includes a controller operatively connected for receiving the generated signal and for controlling the writing and reading of data to and from the at least one disk platter according to the determined rate indicated by the generated signal.

3. The energy storage device of claim 1, further comprising circuitry operatively connected for controlling the transfer of electrical power to and from the at least one electrical coil, wherein the circuitry further comprises:

logic executable by the circuitry for determining whether electrical power is available from an external power supply;

logic executable by the circuitry in response to a determination that electrical power is available from an external power supply, for determining whether the electrical power that is available is greater than a predetermined quantity of power; and logic executable by the circuitry in response to a determination that available electrical power is not greater than a predetermined quantity of power, for electrically connecting the at least one electrical coil for generating electrical power as the magnetic field is caused from rotation of the flywheel and the at least one magnet embedded therein to move across the at least one coil.

4. The energy storage device of claim 3, further comprising:
   a sensor for determining the rate of rotation of the shaft, and for generating to the circuitry a signal indicative of the determined rate; and
   wherein the circuitry is operatively connected for receiving the generated signal and further comprises:
      logic executable by the circuitry for determining whether the determined rate of rotation of the shaft is greater than a predetermined rate; and
      logic executable by the circuitry in response to a determination that the determined rate of rotation of the shaft is not greater than the predetermined rate, for generating an alert signal.

5. The energy storage device of claim 1, further comprising circuitry operatively connected for controlling the transfer of electrical power to and from the at least one electrical coil, wherein the circuitry further comprises:
   logic executable by the circuitry for determining whether electrical power is available from an external power supply;
   logic executable by the circuitry in response to a determination that electrical power is available from an external power supply, for determining whether the electrical power that is available is greater than a predetermined quantity of power; and
   logic executable by the circuitry in response to a determination that available electrical power is greater than a predetermined quantity of power, for electrically connecting the at least one electrical coil for generating the electromagnetic field effective for selectively repulsing or attracting the at least one magnet thereby rotating the flywheel.

6. The energy storage device of claim 5, further comprising:
   a sensor for determining the rate of rotation of the shaft, and for generating to the circuitry a signal indicative of the determined rate; and
   wherein the circuitry is operatively connected for receiving the generated signal and further comprises:
      logic executable by the circuitry for determining whether the rate of rotation of the shaft indicated by the generated signal is less than a predetermined rate;
      logic executable by the circuitry in response to a determination that the rate of rotation of the shaft indicated by the generated signal is less than a predetermined rate, for increasing the electrical power supplied to the at least one electrical coil;
      logic executable by the circuitry in response to a determination that available electrical power is greater than a predetermined quantity of power, for determining whether the rate of rotation of the shaft indicated by the generated signal is greater than a predetermined rate; and
      logic executable by the circuitry in response to a determination that the rate of rotation of the shaft indicated by the generated signal is greater than a predetermined rate, for decreasing the electrical power supplied to the at least one electrical coil.

7. The energy storage device of claim 1, further comprising circuitry operatively connected for controlling the transfer of electrical power to and from the at least one electrical coil, wherein the circuitry further comprises:
   logic executable by the circuitry for determining whether electrical power is available from an external power supply; and
   logic executable by the circuitry in response to a determination that electrical power is not available from an external power supply, for electrically connecting the at least one electrical coil for generating electrical energy as the magnetic field is caused from rotation of the flywheel and the at least one magnet embedded therein to move across the at least one coil.

8. The energy storage device of claim 7, further comprising:
   a sensor for determining the rate of rotation of the shaft, and for generating to the circuitry a signal indicative of the determined rate; and
   wherein the circuitry is operatively connected for receiving the generated signal and further comprises:
      logic executable by the circuitry for determining whether the determined rate of rotation of the shaft is greater than a predetermined rate; and
      logic executable by the circuitry in response to a determination that the determined rate of rotation of the shaft is not greater than the predetermined rate, for generating an alert signal.

9. The energy storage device of claim 8, further comprising means responsive to generation of the alert signal for providing an audible indication signal.

10. The energy storage device of claim 8, further comprising means responsive to generation of the alert signal for providing a visual indication signal.

11. The energy storage device of claim 10, wherein the indicating means is a light emitting diode (LED).

12. The energy storage device of claim 10, wherein the indicating means is a video display.

13. A system for storing energy, comprising:
   a disk drive having a housing, a shield mounted in the housing separating a disk platter section of the housing from a flywheel section of the housing, a shaft mounted within the housing for rotation about an axis, at least one magnetically encodable disk platter coupled to a first portion of the shaft for rotation in the disk platter section for rotation about the axis and for storing data, and at least one head positioned in the housing for writing data to and reading data from the at least one disk platter;
   a flywheel coupled to a second portion of the shaft for rotation in the flywheel section for rotation about the axis;
   at least one magnet embedded in the flywheel, wherein the at least one magnet defines a magnetic field emanating therefrom; and
   at least one electrical coil positioned in the flywheel section and switchably connectable to an electrical power supply line for:
      receiving electrical energy from the power supply line and generating an electromagnetic field effective for selectively repulsing or attracting the at least one magnet to thereby rotate the flywheel in a predetermined direction and convert electrical energy in the at least one coil into kinetic energy in the flywheel; and
      generating electrical energy to the power supply line as the magnetic field is caused from rotation of the flywheel and the at least one magnet embedded therein to move across the at least one coil and to thereby convert kinetic energy in the flywheel into electrical energy in the at least one coil to thereby provide power for continuing the flywheel rotation in said predetermined direction.

14. The system of claim 13, further comprising circuitry operatively connected for controlling the transfer of electrical power to and from the at least one electrical coil, wherein the circuitry further comprises:

means for determining whether electrical power is available from an external power supply;

means responsive to a determination that electrical power is available from an external power supply, for determining whether the electrical power that is available is greater than a predetermined quantity of power; and means responsive to a determination that available electrical power is not greater than a predetermined quantity of power, for electrically connecting the at least one electrical coil for generating electrical power as the magnetic field is caused from rotation of the flywheel and the at least one magnet embedded therein to move across the at least one coil.

15. The system of claim 14, further comprising:

a sensor for determining the rate of rotation of the shaft, and for generating to the circuitry a signal indicative of the determined rate; and wherein the circuitry is operatively connected for receiving the generated signal and further comprises:

means for determining whether the determined rate of rotation of the shaft is greater than a predetermined rate; and means responsive to a determination that the determined rate of rotation of the shaft is not greater than the predetermined rate, for generating an alert signal.

16. The system of claim 13, further comprising circuitry operatively connected for controlling the transfer of electrical power to and from the at least one electrical coil, wherein the circuitry further comprises:

means for determining whether electrical power is available from an external power supply;

means responsive to a determination that electrical power is available from an external power supply, for determining whether the electrical power that is available is greater than a predetermined quantity of power; and means responsive to a determination that available electrical power is greater than a predetermined quantity of power, for electrically connecting the at least one electrical coil for generating the electromagnetic field effective for selectively repulsing or attracting the at least one magnet thereby rotating the flywheel.

17. The system of claim 16, further comprising:

a sensor for determining the rate of rotation of the shaft, and for generating to the circuitry a signal indicative of the determined rate; and wherein the circuitry is operatively connected for receiving the generated signal and further comprises:

means for determining whether the rate of rotation of the shaft indicated by the generated signal is less than a predetermined rate;

means responsive to a determination that the rate of rotation of the shaft indicated by the generated signal is less than a predetermined rate, for increasing the electrical power supplied to the at least one electrical coil;

means responsive to a determination that available electrical power is greater than a predetermined quantity of power, for determining whether the rate of rotation of the shaft indicated by the generated signal is greater than a predetermined rate; and means responsive to a determination that the rate of rotation of the shaft indicated by the generated signal is greater than a predetermined rate, for decreasing the electrical power supplied to the at least one electrical coil.

18. The system of claim 13, further comprising circuitry operatively connected for controlling the transfer of electrical power to and from the at least one electrical coil, wherein the circuitry further comprises:

means for determining whether electrical power is available from an external power supply; and means responsive to a determination that electrical power is not available from an external power supply, for electrically connecting the at least one electrical coil for generating electrical power as the magnetic field is caused from rotation of the flywheel and the at least one magnet embedded therein to move across the at least one coil.

19. The system of claim 18, further comprising:

a sensor for determining the rate of rotation of the shaft, and for generating to the circuitry a signal indicative of the determined rate; and wherein the circuitry is operatively connected for receiving the generated signal and further comprises:

means for determining whether the determined rate of rotation of the shaft is greater than a predetermined rate; and means responsive to a determination that the determined rate of rotation of the shaft is not greater than the predetermined rate, for generating an alert signal.

20. The system of claim 19, further comprising means responsive to generation of the alert signal for providing an audible indication signal.

21. The system of claim 19, further comprising means responsive to generation of the alert signal for providing a visual indication signal.

22. The system of claim 21, wherein the indicating means is a light emitting diode (LED).

23. The system of claim 21, wherein the indicating means is a video display.

24. A computer comprising:

a power supply for supply electrical energy onto a power supply;

a central processing unit (CPU) connected for receiving electrical energy from the power supply line;

a disk drive memory having a housing, the housing having a shield therein separating a disk platter section of the housing from a flywheel section of the housing, a shaft rotatably mounted within the housing, at least one disk platter coupled to a first portion of the shaft for rotation in the disk platter section for storing data, and at least one head positioned in the housing and operatively connected to the CPU for transferring data between the at least one disk platter and the CPU;

a flywheel coupled to a second portion of the shaft for rotation in the flywheel section;

at least one magnet embedded in the flywheel, wherein the at least one magnet defines a magnetic field emanating therefrom; and at least electrical one coil positioned in the flywheel section and switchably connectable to an electrical power supply line for:

receiving electrical energy from the power supply line and generating an electromagnetic field effective for selectively repulsing or attracting the at least one magnet to thereby rotate the flywheel in a predetermined direction and convert electrical energy in the at least one coil into kinetic energy in the flywheel; and generating electrical energy to the power supply line as the magnetic field is caused from rotation of the flywheel and the at least one magnet embedded therein to move across the at least one coil and to thereby convert kinetic energy in the flywheel into electrical energy in the at least one coil to thereby provide power for continuing the flywheel rotation in said predetermined direction.

25. The computer of claim 24 wherein the flywheel and the at least one disk platter are configured for rotating synchronously.

26. The computer of claim 24, further comprising:
a sensor for determining the rate of rotation of the shaft, and for generating a signal indicative of the determined rate; and
wherein the disk drive further includes a controller operatively connected for receiving the generated signal and for controlling the writing and reading of data to and from the at least one disk platter according to the determined rate indicated by the generated signal.

27. The computer of claim 24, further comprising circuitry operatively connected for controlling the transfer of electrical power to and from the at least one electrical coil, wherein the circuitry further comprises:
logic executable by the circuitry for determining whether electrical power is available from an external power supply;
logic executable by the circuitry in response to a determination that electrical power is available from an external power supply, for determining whether the electrical power that is available is greater than a predetermined quantity of power; and
logic executable by the circuitry in response to a determination that available electrical power is not greater than a predetermined quantity of power, for electrically connecting the at least one electrical coil for generating electrical power as the magnetic field is caused from rotation of the flywheel and the at least one magnet embedded therein to move across the at least one coil.

28. The computer of claim 27, further comprising:
a sensor for determining the rate of rotation of the shaft, and for generating to the circuitry a signal indicative of the determined rate; and
wherein the circuitry is operatively connected for receiving the generated signal and further comprises:
logic executable by the circuitry for determining whether the determined rate of rotation of the shaft is greater than a predetermined rate; and
logic executable by the circuitry in response to a determination that the determined rate of rotation of the shaft is not greater than the predetermined rate, for generating an alert signal.

29. The computer of claim 24, further comprising circuitry operatively connected for controlling the transfer of electrical power to and from the at least one electrical coil, wherein the circuitry further comprises:
logic executable by the circuitry for determining whether electrical power is available from an external power supply;
logic executable by the circuitry in response to a determination that electrical power is available from an external power supply, for determining whether the electrical power that is available is greater than a predetermined quantity of power; and
logic executable by the circuitry in response to a determination that available electrical power is greater than a predetermined quantity of power, for electrically connecting the at least one electrical coil for generating the electromagnetic field effective for selectively repulsing or attracting the at least one magnet thereby rotating the flywheel.

30. The computer of claim 29, further comprising:
a sensor for determining the rate of rotation of the shaft, and for generating to the circuitry a signal indicative of the determined rate; and
wherein the circuitry is operatively connected for receiving the generated signal and further comprises:
logic executable by the circuitry for determining whether the rate of rotation of the shaft indicated by the generated signal is less than a predetermined rate;
logic executable by the circuitry in response to a determination that the rate of rotation of the shaft indicated by the generated signal is less than a predetermined rate, for increasing the electrical power supplied to the at least one electrical coil;
logic executable by the circuitry in response to a determination that available electrical power is greater than a predetermined quantity of power, for determining whether the rate of rotation of the shaft indicated by the generated signal is greater than a predetermined rate; and
logic executable by the circuitry in response to a determination that the rate of rotation of the shaft indicated by the generated signal is greater than a predetermined rate, for decreasing the electrical power supplied to the at least one electrical coil.

31. The computer of claim 24, further comprising means for inputting data to the CPU and means for outputting data from the CPU.

32. The computer of claim 31 wherein the inputting means is a keyboard electrically connected to the CPU.

33. The computer of claim 31 wherein the outputting means is a video monitor electrically connected to the CPU.

34. The computer of claim 24, further comprising circuitry operatively connected for controlling the transfer of electrical power to and from the at least one electrical coil, wherein the circuitry further comprises:
logic executable by the circuitry for determining whether electrical power is available from an external power supply; and
logic executable by the circuitry in response to a determination that electrical power is not available from an external power supply, for electrically connecting the at least one electrical coil for generating electrical power as the magnetic field is caused from rotation of the flywheel and the at least one magnet embedded therein to move across the at least one coil.

35. The computer of claim 34, further comprising:
a sensor for determining the rate of rotation of the shaft, and for generating to the circuitry a signal indicative of the determined rate; and
wherein the circuitry is operatively connected for receiving the generated signal and further comprises:
logic executable by the circuitry for determining whether the determined rate of rotation of the shaft is greater than a predetermined rate; and
logic executable by the circuitry in response to a determination that the determined rate of rotation of the shaft is not greater than the predetermined rate, for generating an alert signal.

36. The computer of claim 35, further comprising means responsive to generation of the alert signal for providing an audio indication signal.

37. The computer of claim 35, further comprising means responsive to generation of the alert signal for providing a visual indication signal.

38. The computer of claim 37, wherein the indicating means is a light emitting diode (LED).

39. The computer of claim 37, wherein the indicating means is a video display.

40. A method for storing energy, comprising:

rotatably mounting a shaft in a housing, the housing having a shield therein separating a disk platter section of the housing from a flywheel section of the housing;

coupling at least one disk platter to a first portion of the shaft for rotation in the disk platter section and a flywheel to a second portion of the shaft for rotation in the flywheel section;

embedding in the flywheel at least one magnet having a magnetic field emanating therefrom; and switchably:

passing electrical energy through at least one electrical coil positioned in the flywheel section and generating an electromagnetic field effective for selectively repulsing or attracting the at least one magnet to thereby rotate the flywheel in a predetermined direction and convert electrical energy in the at least one coil into kinetic energy in the flywheel; and generating electrical energy as the magnetic field is caused from rotation of the flywheel and the at least one magnet embedded therein to move across the at least one coil and to thereby convert kinetic energy in the flywheel into electrical energy in the at least one coil to thereby provide power for continuing the flywheel rotation in said, predetermined direction.

41. The method of claim 40, further comprising controlling the transfer of electrical power to and from the at least one electrical coil, wherein the step of controlling comprises:

determining whether electrical power is delivered to or from the at least one electrical coil;

in response to a determination that electrical power is available from an external power supply, determining whether the electrical power that is available is greater than a predetermined quantity of power; and in response to a determination that available electrical power is not greater than a predetermined quantity of power, electrically connecting the at least one electrical coil for generating electrical power as the magnetic field is caused from rotation of the flywheel and the at least one magnet embedded therein to move across the at least one coil.

42. The method of claim 41, further comprising:

determining the rate of rotation of the shaft, and generating to the circuitry a signal indicative of the determined rate; and determining whether the determined rate of rotation of the shaft is greater than a predetermined rate; and in response to a determination that the determined rate of rotation of the shaft is not greater than the predetermined rate, generating an alert signal.

43. The method of claim 40, further comprising controlling the transfer of electrical power to and from the at least one electrical coil, wherein the step of controlling comprises:

determining whether electrical power is available from an external power supply;

in response to a determination that electrical power is available from an external power supply, determining whether the electrical power that is available is greater than a predetermined quantity of power; and in response to a determination that available electrical power is greater than a predetermined quantity of power, electrically connecting the at least one electrical coil for generating the electromagnetic field effective for selectively repulsing or attracting the at least one magnet thereby rotating the flywheel.

44. The method of claim 43, further comprising:

determining the rate of rotation of the shaft, and generating to the circuitry a signal indicative of the determined rate; and determining whether the rate of rotation of the shaft indicated by the generated signal is less than a predetermined rate;

in response to a determination that the rate of rotation of the shaft indicated by the generated signal is less than a predetermined rate, increasing the electrical power supplied to the at least one electrical coil;

in response to a determination that available electrical power is greater than a predetermined quantity of power, determining whether the rate of rotation of the shaft indicated by the generated signal is greater than a predetermined rate; and in response to a determination that the rate of rotation of the shaft indicated by the generated signal is greater than a predetermined rate, decreasing the electrical power supplied to the at least one electrical coil.

45. The method of claim 40, further comprising the step of controlling the transfer of electrical power to and from the at least one electrical coil, the step of controlling comprising:

determining whether electrical power is available from an external power supply; and in response to a determination that electrical power is not available from an external power supply, electrically connecting the at least one electrical coil for generating electrical power as the magnetic field is caused from rotation of the flywheel and the at least one magnet embedded therein to move across the at least one coil.

46. The method of claim 45, further comprising:

determining the rate of rotation of the shaft, and generating to the circuitry a signal indicative of the determined rate;

determining whether the determined rate of rotation of the shaft is greater than a predetermined rate; and in response to a determination that the determined rate of rotation of the shaft is not greater than the predetermined rate, generating an alert signal.

47. The method of claim 46, further comprising providing an audio indication signal in response the alert signal.

48. The method of claim 46, further comprising providing a visual indication signal in response to the alert signal.

49. The method of claim 46, further comprising illuminating a light emitting diode (LED) in response to the alert signal.

50. The method of claim 46, further comprising generating a warning message to a video display in response to the alert signal.

* * * * *